Sept. 22, 1970   L. BERTELE ET AL   3,530,436
OIL IMMERSION OBJECTIVE WITH FLATTENED IMAGE FIELD
CONTAINING A FREE-STANDING BICONCAVE LENS
OF STRONG REFRACTIONAL POWER Filed Jan. 6, 1967   2 Sheets-Sheet 1

LUDWIG BERTELE
JÜRGEN BERTELE
INVENTORS

BY Jacobi & Davidson
ATTORNEYS

Spherical Aberration Curve

United States Patent Office 3,530,436
Patented Sept. 22, 1970

3,530,436
OIL IMMERSION OBJECTIVE WITH FLATTENED IMAGE FIELD CONTAINING A FREE-STANDING BICONCAVE LENS OF STRONG REFRACTIONAL POWER
Ludwig Bertele and Jürgen Bertele, Heerbrugg, Switzerland; said Jürgen Bertele assignor to Wild Heerbrugg, Aktiengesellschaft, Heerbrugg, Switzerland, a corporation of Switzerland
Filed Jan. 6, 1967, Ser. No. 607,733
Claims priority, application Switzerland, Jan. 11, 1966, 530/66
Int. Cl. G02b 9/64, 21/02
U.S. Cl. 350—176                                      9 Claims

ABSTRACT OF THE DISCLOSURE

A microscope objective of the immersion type with an aperture larger than 0.95 is disclosed, such objective which, considered from the object, comprises a lens assembly with collective power of refraction, a lens member with dispersive power of refraction having a biconcave form, and a lens member with collective power of refraction, and wherein the following conditions are simultaneously fulfilled: (a) the axial focal length of the dispersive lens member is in the range of about $-0.6F$ and $-1.50F$, wherein F represents the total focal length of the objective with respect to air; and, (b) the image of the object produced by a smaller aperture through the collective lens assembly is spaced at 0.7F to 2.3F from the main point of the dispersive lens member at the side of the image, and said image is depicted magnified more than 1.3-fold, due to the refraction at the dispersive lens member.

BACKGROUND OF THE INVENTION

The present invention has reference to an improved microscope objective with flat image field and is only usable with oil immersion.

For the purpose of flattening the image field in dry systems, in known manner, the lens member or element directly following the object is strongly curved or bent towards the image in the form of a maniscus, wherein the axial lens thickness is large in relation to the short radius of curvature. However, this decisive measure which is required for image flattening is without effect in immersion objectives, since the use of oil considerably nullifies the optical effect of the hollow surface. Therefore, the image flattening means must be introduced at other locations of the objective, and consequently, physical constructions of microscope objectives are known in which, for this reason, those lens members which face the image are constructed as very thick meniscuses.

However, investigations have proven that it is unnecessary to introduce meniscus-shaped lens elements for this purpose in immersion objectives since a thin lens member with stronger dispersive power of refraction applied at a suitable location can also undertake this function. Consequently, there results a relatively simple construction of the total objective.

Basically, such an objective is composed of three portions or components, and specifically, starting from the object, a lens group or assembly consisting of a number of collecting lens elements separated by air spaces or gaps, subsequent thereto and after an air space the dispersing lens member, and once again after a further air space or gap the collecting lens member. Such lens sequences are known for dry systems insofar as directly at the object there is arranged a thick meniscus and further collecting lens elements, thereafter a dispersing lens for the purpose of correcting astigmatism, and furthermore, a collecting lens. As already mentioned, if however with immersion objectives there is to be dispensed with the image flattening effect of the meniscus-shaped front lens, then, the conditions completely change notwithstanding the similar sequence of the lenses.

SUMMARY OF THE INVENTION

Accordingly, in order then to obtain an objective having a flattened image field, it is necessary, according to the invention, to considerably increase the power of refraction of the negative or dispersive member, which is now the only image flattening element, in relation to the total focal length of the objective. In this manner, it is possible to amply comply with the requirements concerning image flattening, whereas, on the other hand, the course or shape of the spherical and spherochromatic aberration curve which would satisfy the performance of the objective for the large apertures typical of oil immersion objectives becomes quite uncertain. However, numerous experiments have surprisingly shown that these fears are unjustified if the following conditions are simultaneously fulfilled:

(1) The axial focal length of the dispersive lens member is in the range of about $-0.6F$ and $-1.50F$, wherein F represents the total focal length of the objective with respect to air; and (2) The image of the object produced by the axial rays passing through the collective lens assembly is spaced at 0.7F to 2.3F from the main point of the dispersive lens member at the side of the image, and said image is depicted magnified more than 1.3-fold due to the refraction at the dispersive lens member.

Furthermore, with regard to flattening of the image, it has been found to be advantageous to space the convex outer surface of the lens member of the collective lens assembly and which directly follows the object and faces the image as far as possible from the object in order to increase the radius of curvature of this surface. Besides this, it is advantageous in almost every respect to form this lens member of at least two lenses, so that it is possible to use a glass having a high refractive index at the surface at the side of the image. The product of this radius of curvature of this convex outer surface and the refractive index at this surface is larger than 2F.

In order to obtain a shape of the spherical aberration curve which is as zone-free as possible, it is advantageous to select the thickness of the collecting element or member located in front of the dispersive lens member as large as possible. Such can possess a thickness up to nine times the total focal length. Additionally, it is advantageous to construct the dispersive lens member as a biconcave individual lens and the collective lens member as a bi-convex cemented or uncemented lens. With this physical structure of the collective lens member there is rendered possible a satisfactory course of the meridian image curve with simultaneous correction of the distortion errors.

With regard to the general correction or rectification of image aberration or distortion it has been found to be advantageous to maintain the total length of the objective between 12.5F and 25F.

BRIEF DESCRIPTION OF THE DRAWINGS

The following examples and drawings illustrate some specific embodiments for carrying out the invention and are given by way of example and not limitation.

In the drawings.

DESCRIPTION OF THE PREFERRED EMBODIMENTS

Figure 1:
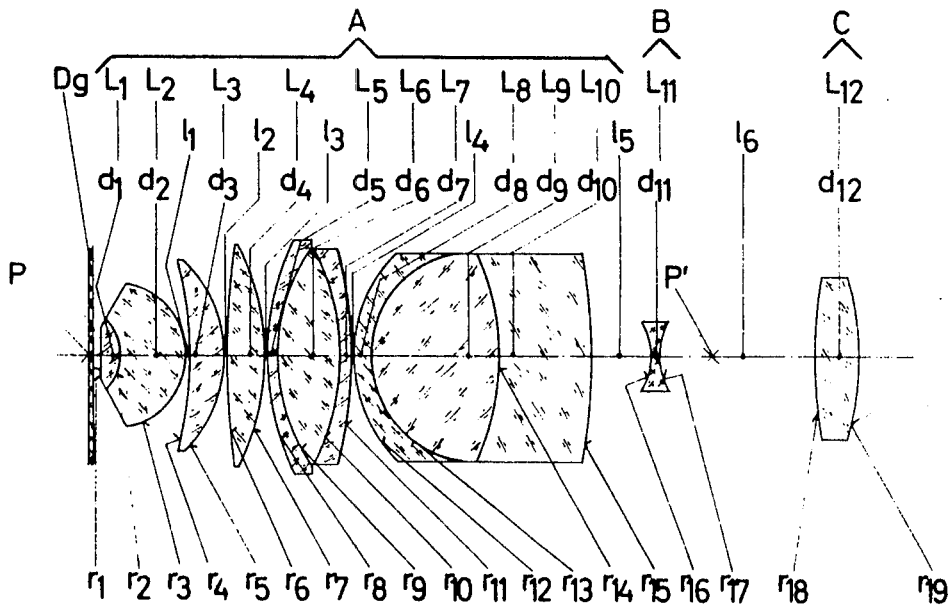
FIG. 1 diagrammatically illustrates a first embodiment of lens structure designed according to the teachings of the present invention.

It will be understood that hereinafter there will be described and illustrated two embodiments of the inventive microscope objective with oil immersion and the associated lens sections. Both inventive objectives provide a 100-fold magnification with an aperture of about 1.3. Owing to the similarity in physical structure of both embodiments, especially since the same number of individual lenses are utilized in both embodiments, the same reference numerals have been conveniently employed herein to designate the same or analogous components. Accordingly, in both cases the first five lens elements or members provide the lens assembly A and incorporate the individual lenses $L_1$ to $L_{10}$. Further, the dispersive lens member B is a simple lens $L_{11}$ and the collective lens member C is a simple lens $L_{12}$. Accordingly, both embodiments incorporate twelve individual lenses, namely, $L_1$ to $L_{12}$. The center of the object is represented by the reference numeral P at the underface of the cover glass Dg and the image P' is formed in the axial zone by the lens assembly A.

In the embodiment of FIG. 1 having a total focal length F=1.907 millimeters, the individual lenses $L_1$ to $L_{10}$ forming the lens assembly A are arranged in such a manner that the lenses $L_1$ and $L_2$ form a cemented front element, the lenses $L_3$ and $L_4$ a respective non-cemented individual lens, the lenses $L_5$, $L_6$ and $L_7$ as well as the lenses $L_8$, $L_9$ and $L_{10}$ respective threefold cemented lenses. These lenses collectively form an image P' from the object P at a distance of 2.395 millimeters=1.256F after the main point of the lens $L_{11}$ at the side of the image. The image P' is magnified 2.3-fold by the lens $L_{11}$ having a focal length of −1.8 millimeters=−0.944F. The refractive index of the lens $L_2$ is 1.88069 and the radius of curvature of the convex outer surface of this lens is 3.066 millimeters. The product of these two values is 5.766=3.024F. The axial thickness of the lens member or element $L_8$, $L_9$ and $L_{10}$, arranged in front of the lens $L_{11}$, is 10.5 millimeters=5.5F. The total length of the objective is 17.5F.

In the embodiment of microscope objective of FIG. 2 having a total focal length F=1.822 millimeters, and the constructional data of which is given in Example II hereinafter, the individual lenses $L_1$ to $L_{10}$ forming the lens assembly A are arranged in such a manner that lenses $L_1$ and $L_2$ form a cemented front element or member, lenses $L_3$ and $L_4$ each represent a respective uncemented lens, lenses $L_5$, $L_6$ and $L_7$ as well as lenses $L_8$, $L_9$ and $L_{10}$ are respective threefold cemented. These lenses collectively form an image P' of the object P at a spacing of 2.74 millimeters=1.503F after the main point of the lens $L_{11}$ at the side of the image. The image P' is magnified 2.06-fold by the lens $L_{11}$ having a focal length of −1.93 millimeters=−1.06F. The refractive index of the lens $L_2$ is 1.80279 and the radius of curvature is 2.59 millimeters. The product of these two values is 4.67=2.56F. The axial thickness of the lens member or element $L_8$, $L_9$ and $L_{10}$, arranged in front of the lens $L_{11}$, is 9.7 millimeters=5.33F. The total length of the objective is 18.4F. The lens $L_9$ is formed from a short flint glass in order to improve the secondary spectrum.

Figure 2:
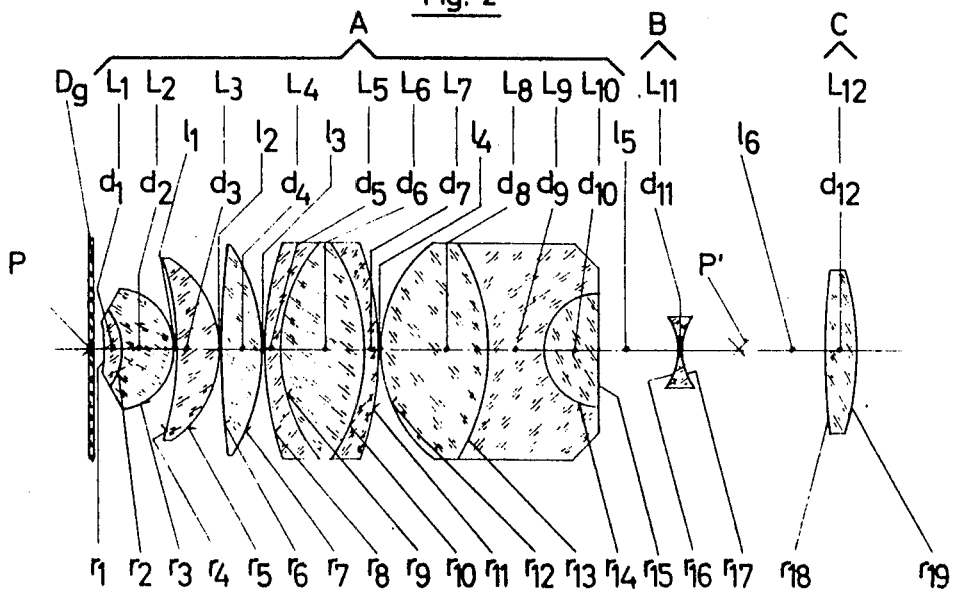
FIG. 2 is a second embodiment of lens structure of microscope objective designed according to the teachings of the present invention.
Figure 3:
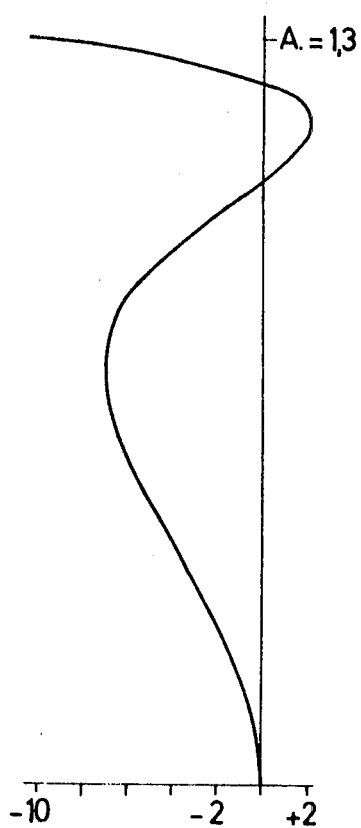
FIG. 3 depicts the spherical aberration curve for the embodiment of lens structure for a microscope objective depicted in FIG. 1.
Figure 4:
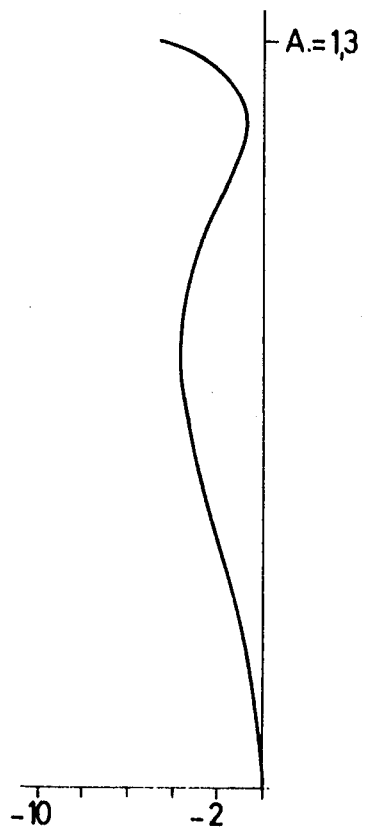
FIG. 4 depicts the spherical aberration curve for the lens structure of FIG. 2.

It will further be recognized that for both embodiments there is depicted the spherical aberration curve, the curve of FIG. 3 corresponding to the embodiment of microscope objective of FIG. 1 and the curve of FIG. 4 to that of the embodiment of FIG. 2. The course of the curves only differ slightly from that of a usual achromatic microscope of the same magnification. Finally, by way of completeness, it is mentioned that the dispersive lens member $L_{11}$ may be a simple bi-concave lens and the collective lens member $L_{12}$ a simple or cemented bi-convex lens.

The constructional data for the lens systems depicted in FIGS. 1 and 2 is given by the following respective Examples I and II, where all linear measurements are given in millimeters, and wherein:

L designates the individual lenses
r designates the radii of curvature
d designates the thickness of the lenses
l designates the air spaces
F designates the focal lengths
$n_d$ designates the refractive index for the helium line of the spectrum
$\nu$ designates Abbe's factor Example I corresponds to the embodiment of FIG. 1, the data for which is given by the following table.

EXAMPLE I

| Cover Glass | | | $n_d$ | $\nu$ |
|---|---|---|---|---|
| Oil | | $d_0$=.0170 | 1.52831 | 58.00 |
| | | $l_0$=0.280 | 1.51510 | 50.00 |
| $L_1$ | $r_1=\infty$ | $d_1$=0.800 | 1.54000 | 50.90 |
| | $r_2$=−2.140 | | | |
| $L_2$ | | $d_2$=3.000 | 1.88069 | 41.00 |
| | $r_3$=−3.066 | | | |
| | | $l_1$=0.040 | | |
| | $r_4$=−21.600 | | | |
| $L_3$ | | $d_3$=1.680 | 1.43388 | 95.50 |
| | $r_5$=−5.670 | | | |
| | | $l_2$=0.040 | | |
| | $r_6$=+41.000 | | | |
| $L_4$ | | $d_4$=1.750 | 1.43388 | 95.50 |
| | $r_7$=−10.230 | | | |
| | | $l_3$=0.050 | | |
| | $r_8$=+11.720 | | | |
| $L_5$ | | $d_5$=0.500 | 1.74000 | 28.16 |
| | $r_9$=+8.000 | | | |
| $L_6$ | | $d_6$=2.700 | 1.43388 | 95.50 |
| | $r_{10}$=−10.460 | | | |
| $L_7$ | | $d_7$=0.500 | 1.74000 | 28.16 |
| | $r_{11}$=−19.300 | | | |
| | | $l_4$=0.050 | | |
| | $r_{12}$=+6.280 | | | |
| $L_8$ | | $d_8$=0.800 | 1.74000 | 28.16 |
| | $r_{13}$=+4.580 | | | |
| $L_9$ | | $d_9$=5.700 | 1.43388 | 95.50 |
| | $r_{14}$=−10.600 | | | |
| $L_{10}$ | | $d_{10}$=4.000 | 1.74000 | 28.16 |
| | $r_{15}$=−28.704 | | | |
| | | $l_5$=2.586 | | |
| | $r_{16}$=−3.176 | | | |
| $L_{11}$ | | $d_{11}$=0.400 | 1.80518 | 25.46 |
| | $r_{17}$=+2.815 | | | |
| | | $l_6$=7.000 | | |
| | $r_{18}$=+33.000 | | | |
| $L_{12}$ | | $d_{12}$=1.900 | 1.69100 | 54.80 |
| | $r_{19}$=−11.720 | | | |

F=1.9068. Numerical aperture=1.30.

Example II corresponds to FIG. 2, the data for which is given by the following table.

EXAMPLE II

| Cover Glass | | | $n_d$ | $\nu$ |
|---|---|---|---|---|
| Oil | | $d_0=0.170$ | 1.51510 | 54.0 |
| | | $l_0=0.380$ | 1.51510 | 50.0 |
| $L_1$ | $r_1=-6.500$ | $d_1=0.800$ | 1.56384 | 60.8 |
| $L_2$ | $r_2=-2.5900$ | $d_2=2.300$ | 1.80279 | 46.8 |
| | $r_3=-2.590$ | $l_1=0.050$ | | |
| | $r_4=-12.4100$ | | | |
| $L_3$ | $r_5=-4.862$ | $d_3=1.900$ | 1.43388 | 95.5 |
| | $r_6=+66.650$ | $l_2=0.050$ | | |
| $L_4$ | | $d_4=1.900$ | 1.43388 | 95.5 |
| | $r_7=-8.428$ | $l_3=0.100$ | | |
| | $r_8=+13.810$ | | | |
| $L_5$ | $r_9=+6.970$ | $d_5=0.700$ | 1.80280 | 39.0 |
| $L_6$ | $r_{10}=-8.240$ | $d_6=3.700$ | 1.43388 | 95.5 |
| $L_7$ | $r_{11}=-14.540$ | $d_7=0.700$ | 1.72151 | 29.3 |
| | $r_{12}=+5.808$ | $l_4=0.100$ | | |
| $L_8$ | $r_{13}=-8.720$ | $d_8=4.800$ | 1.43388 | 95.5 |
| $L_9$ | $r_{14}=+2.429$ | $d_9=2.500$ | 1.61340 | 43.9 |
| $L_{10}$ | $r_{15}=-153.500$ | $d_{10}=2.400$ | 1.61272 | 58.6 |
| | $r_{16}=-3.024$ | $l_5=3.365$ | | |
| $L_{11}$ | $r_{17}=+2.680$ | $d_{11}=0.300$ | 1.72000 | 37.5 |
| | $r_{18}=+25.100$ | $l_6=6.300$ | | |
| $L_{12}$ | $r_{19}=-10.250$ | $d_{12}=1.500$ | 1.62041 | 60.3 |

F=1.8216. Numerical aperture=1.30.

What is claimed is:

1. A microscope objective of the oil immersion type having a flattened image field, comprising seven air-spaced lens members, with the sixth lens member measured from the object having dispersive refractional power and the remaining lens members all having collective refractional power, said members being arranged such that:
   (a) the first lens member has a strongly convex surface towards the image and a cemented surface which is bent towards the image and possesses a higher refractive index at the image side than at the object side;
   (b) the second lens member is a simple collective meniscus which is bent towards the image;
   (c) the third lens member is a simple collective lens whose more strongly convexly curved surface is facing the image;
   (d) the fourth lens member is a cemented member with convex outer surfaces, and consisting of a biconvex collective lens cemented between dispersive meniscus lenses, with the refractive index of each of said meniscus lenses being higher than that of the collective lens;
   (e) the fifth lens member is also a cemented member with a convex outer surface which is strongly curved towards the object, and consisting of a bi-convex lens with low refractive index and at least one dispersive lens with a high refractive index;
   (f) the sixth lens member is a simple bi-concave lens with an axial focal length in the range of approximately $-0.9F$ and approximately $-1.1F$, wherein F represents the total focal length of the objective with respect to air;
   (g) the seventh lens member is a simple bi-convex lens with convex outer surfaces; and
   (h) the image of the object through the collective lens members 1 to 5 is spaced at a distance greater than F from the main point of the dispersive lens member at the side of the image and said image is depicted magnified more than 1.3 fold due to the refraction of the dispersive lens member.

2. A microscope objective as defined in claim 1, the product of the radius of curvature of the convex outer surface of said first lens member and the refractive index of said first lens member is approximately 3F.

3. A microscope objective as defined in claim 1, wherein the product of the radius of curvature of the convex outer surface of said first lens member and the refractive index of said first lens member is approximately 2.6F.

4. A microscope objective as defined in claim 1, wherein said fifth lens member has a thickness of approximately 5.5F.

5. A microscope objective as defined in claim 1, wherein said fifth lens member has a thickness of approximately 5.3F.

6. A microscope objective as defined in claim 1, wherein the total length of the objective is approximately 17.5F.

7. A microscope objective as defined in claim 1, wherein the total length of the objective is approximately 18.4F.

8. A microscope objective as defined in claim 1, wherein said first lens member is formed of lenses L1 and L2, said second lens member is designated L3, said third lens member is designated L4, said fourth lens member consists of lenses L5, L6, and L7, said fifth lens member consists of lenses L8, L9, and L10, said sixth lens member is designated L11, and said seventh lens member is designated L12, the image of the object through the collective lens members 1–5 is spaced at a distance of 1.256F from the main point of the dispersive lens member at the side of the image, said image is magnified 2.3-fold due to the refraction at the dispersive lens member, the axial thickness of said fifth lens member 5.5F, the total length of the objective is 17.5F and the specific constructional data for said objective are given in the following table wherein:

L designates the individual lenses
r designates the radii of curvature
d designates the thickness of the lenses
l designates the air spaces
F designates the focal lengths
$n_d$ designates the refractive index for the helium line of the spectrum
$\nu$ designates Abbe's factor

| Cover Glass | | | $n_d$ | $\nu$ |
|---|---|---|---|---|
| Oil | | $d_0=0.170$ | 1.52831 | 58.00 |
| | $r_1=\infty$ | $l_0=0.280$ | 1.51510 | 50.00 |
| $L_1$ | $r_2=-2.140$ | $d_1=0.800$ | 1.54000 | 50.90 |
| $L_2$ | $r_3=-3.066$ | $d_2=3.000$ | 1.88069 | 41.00 |
| | $r_4=-21.600$ | $l_1=0.040$ | | |
| $L_3$ | $r_5=-5.670$ | $d_3=1.680$ | 1.43388 | 95.50 |
| | $r_6=+41.000$ | $l_2=0.040$ | | |
| $L_4$ | $r_7=-10.230$ | $d_4=1.750$ | 1.43388 | 95.50 |
| | $r_8=+11.720$ | $l_3=0.050$ | | |
| $L_5$ | $r_9=+8.000$ | $d_5=0.500$ | 1.74000 | 28.16 |
| $L_6$ | $r_{10}=-10.460$ | $d_6=2.700$ | 1.43388 | 95.50 |
| $L_7$ | $r_{11}=-19.300$ | $d_7=0.500$ | 1.74000 | 28.16 |
| | $r_{12}=+6.280$ | $l_4=0.050$ | | |
| $L_8$ | $r_{13}=+4.580$ | $d_8=0.800$ | 1.74000 | 28.16 |
| $L_9$ | $r_{14}=-10.600$ | $d_9=5.700$ | 1.43388 | 95.50 |
| $L_{10}$ | $r_{15}=-28.704$ | $d_{10}=4.000$ | 1.74000 | 28.16 |
| | $r_{16}=-3.176$ | $l_5=2.586$ | | |
| $L_{11}$ | $r_{17}=+2.815$ | $d_{11}=0.400$ | 1.80518 | 25.46 |
| | $r_{18}=+33.000$ | $l_6=7.000$ | | |
| $L_{12}$ | $r_{19}=-11.720$ | $d_{12}=1.900$ | 1.69100 | 54.80 |

F=1.9068. Numerical aperture=1.30.

9. A microscope objective as defined in claim 1, wherein said first lens member consists of lenses L1 and L2, said second lens member is designated L3, said third lens member is designated L4, said fourth lens member consists of lenses L5, L6, and L7, said fifth lens member consists of lenses L8, L9, and L10, said sixth lens member is designated L11, and said seventh lens member is designated L12, the image of the objective through the collective lens members 1–5 is spaced at a distance of 1.503F from the main point of the dispersive lens member at the side of the image and the image is magnified 2.06-fold due to the refraction at the dispersive lens member, said lens L11 has a focal length of −1.93 mm., the axial thickness of said fifth lens member is 5.33F, and the total length of the objective is 18.4F, the specific constructional data for said objective being given in the following table wherein:

L designates the individual lenses
r designates the radii of curvature
d designates the thickness of the lenses
l designates the air spaces
F designates the focal lengths
$n_d$ designates the refractive index for the helium line of the spectrum
$\nu$ designates Abbe's factor

| Cover Glass | | | $n_d$ | $\nu$ |
|---|---|---|---|---|
| Oil | | $d_0=0.170$ | 1.51510 | 54.0 |
| | | $l_0=0.380$ | 1.51510 | 50.0 |
| L1 | $r_1=-6.500$ | $d_1=0.800$ | 1.56384 | 60.8 |
| L2 | $r_2=-2.5900$ | $d_2=2.300$ | 1.80279 | 46.8 |
| | $r_3=-2.590$ | $l_1=0.050$ | | |
| L3 | $r_4=-12.4100$ | $d_3=1.900$ | 1.43388 | 95.5 |
| | $r_5=-4.862$ | $l_2=0.050$ | | |
| L4 | $r_6=+66.650$ | $d_4=1.900$ | 1.43388 | 95.5 |
| | $r_7=-8.428$ | $l_3=0.100$ | | |
| L5 | $r_8=+13.810$ | $d_5=0.700$ | 1.80280 | 39.0 |
| L6 | $r_9=+6.970$ | $d_6=3.700$ | 1.43388 | 95.5 |
| L7 | $r_{10}=-8.240$ | $d_7=0.700$ | 1.72151 | 29.3 |
| | $r_{11}=-14.540$ | $l_4=0.100$ | | |
| L8 | $r_{12}=+5.808$ | $d_8=4.800$ | 1.43388 | 95.5 |
| L9 | $r_{13}=-8.720$ | $d_9=2.500$ | 1.61340 | 43.9 |
| L10 | $r_{14}=+2.429$ | $d_{10}=2.400$ | 1.61272 | 58.6 |
| | $r_{15}=-153.500$ | $l_5=3.365$ | | |
| L11 | $r_{16}=-3.024$ | $d_{11}=0.300$ | 1.72000 | 37.5 |
| | $r_{17}=+2.680$ | $l_6=6.300$ | | |
| L12 | $r_{18}=+25.100$ | $d_{12}=1.500$ | 1.62041 | 60.3 |
| | $r_{19}=-10.250$ | | | |

F=1.8216. Numerical aperture=1.30.

References Cited

UNITED STATES PATENTS

| 2,050,024 | 8/1936 | Sonnefeld | 350—177 X |
| 3,297,393 | 1/1967 | Ziegler | 350—220 X |
| 3,380,793 | 4/1968 | Klein | 350—214 X |

JOHN K. CORBIN, Primary Examiner

U.S. Cl. X.R.
350—177, 214